(12) United States Patent
Bodnar

(10) Patent No.: US 6,339,947 B1
(45) Date of Patent: Jan. 22, 2002

(54) ROTARY APPARATUS WITH MOVEABLE DIE

(75) Inventor: Ernest Robert Bodnar, Don Mills (CA)

(73) Assignee: Rotary Press Systems, Inc., Toronto (CA)

( * ) Notice: Subject to any disclaimer, the term of this patent is extended or adjusted under 35 U.S.C. 154(b) by 0 days.

(21) Appl. No.: 09/440,559

(22) Filed: Nov. 15, 1999

Related U.S. Application Data

(63) Continuation of application No. 09/132,019, filed on Aug. 10, 1998, now Pat. No. 5,983,693, and a division of application No. 08/403,732, filed on Mar. 15, 1995, now Pat. No. 5,791,185.

(30) Foreign Application Priority Data

Oct. 2, 1992 (CA) .............................................. 2079721

(51) Int. Cl.[7] .............................................. B21D 37/12
(52) U.S. Cl. .......................................... 72/190; 83/328
(58) Field of Search .................... 72/190, 191; 83/314, 83/324, 328

(56) References Cited

U.S. PATENT DOCUMENTS 1,581,236 A * 4/1926 Speer .......................... 83/328
4,732,028 A * 3/1988 Bodnar ........................ 72/190

* cited by examiner

Primary Examiner—Lowell A. Larson
(74) Attorney, Agent, or Firm—Jon Carl Gealow

(57) ABSTRACT

A rotary apparatus (20) for rotary forming of a web workpiece (12) and having a rotatable first roll unit (32) and corresponding rotatable second roll unit (34), a first die support (46) carried by the first roll unit (32), having a leading edge (51) and a trailing edge (52) respective to rotation of the first roll unit (32), a second die support (46) carried by the second roll unit (34), having a leading edge (51) and a trailing edge (52) respective to rotation of the second roll unit (34), the first and second roll units (32, 34) receiving a web workpiece (12) in a forming plane between the first and second roll units (32, 34), and in which each die support (46) includes a first part (46a) carried by the respective roll unit and including the leading and trailing edge and a second part (46b) having a platen surface for mounting a die, the second part (46b) being mounted on the first part (46a) for reciprocal motion transverse to the leading and trailing edges (51, 52).

17 Claims, 10 Drawing Sheets

ROTARY APPARATUS WITH MOVEABLE DIE

This application is a continuation of copending U.S. Application Ser. No. 09/132,019, filed Aug. 10, 1998, now U.S. Pat. No. 5,983,693, as a division of U.S. Application Ser. No. 08/403,732, filed Mar. 15, 1995, now U.S. Pat. No. 5,791,185.

TECHNICAL FIELD

The invention relates to rotary apparatus for performing a variety of functions on a moving workpiece. The workpiece may be a continuous strip, or may be a series of separate strips, which move continuously through the rotary apparatus. The material in many cases will be strip steel, but the invention is of much wider application.

BACKGROUND ART

Rotary apparatus for performing a variety of functions on continuous strip material such as strip steel, have been proposed over the last at least fifty years. However, a need has remained for a rotary apparatus to satisfactorily perform precise functions on a moving strip. There are necessarily upper and lower rotary devices which register with one another and they carry respective upper and lower rotary dies. It is well known in all die forming operations that the two dies must register precisely with one another on opposite sides of the workpiece before they close. It is for this that most of the earlier proposals have not been successful. No way was known to achieve a satisfactory form of precise registration of each pair of dies.

However, in U.S. Pat. No. 5,040,397 of Ernest R. Bodnar, Rotary Apparatus granted Aug. 20, 1991, there is shown a form of rotary apparatus, in which upper and lower rotary devices carried semi-rotary die carriers. The die carriers were themselves guided by guide pins. The guide pins rode in cam tracks. The guide pins were located in pairs, one at each end, of each of the semi-rotary devices, and the guide cams were located at opposite ends of the rotary devices.

By offsetting one of the guide pins at one end relative to the guide pin at the other end, and also by precisely profiling the guide cams at each end of each of the rotary devices, it was possible to bring the semi-rotary die supports into precise registration just prior to closing, and during closing, and just after closing on the workpiece. This proposal has proved to be satisfactory for many applications. An improvement to the above described apparatus of U.S. Pat. No. 5,040,397 is described in Canadian Patent Application No. 2,066,803. In that patent application, the inventor, Ernest R. Bodnar, describes the provision of guide pins on each of the semi-rotary die supports. By offsetting respective forward and rearward guide pins on respective guide supports, and by providing two separate guide cams at each end of the rotary apparatus, it then became possible to provide for all four pins to engage respective guide cams just prior to closing, during closing, and just after closing. This proposal may produce a much improved degree of registration between the respective dies carried on the die support. This is particularly important in heavier duty applications, or in applications where the line speed was desired to be increased. Even in this system however there were limitations. For example, it will be understood from a simple geometrical analysis that whereas two dies may register with one another just prior to closing, and during closing and after closing, they are in fact traversing arcs of a circle, as the rotary supports rotate.

This means that the linear speed of the die was greatest at the point where the two dies closed, and was somewhat reduced just prior to closing and just after closing.

On the other hand, since the dies are required to perform operations on a flat workpiece, whether a continuous strip, or discontinuous strip pieces, it will be apparent that there is a very slight degree of "mismatch" in speed of forward movement as between the pair of dies, and the workpiece between them just before closing and just after closing. Precise speed matching is achieved only at the point where the dies are fully closed on the workpiece and the planes of the two dies are precisely tangential to each other.

In operations where relatively thin workpieces were being treated, or where relatively shallow formations were being formed, this slight degree of mismatch in speed did not produce any serious consequences. However, it is desirable to apply this technology to a wider range of products. It is desirable to apply this technology to products having a greater physical thickness than relatively thin sheet metal workpieces, and it is also desirable to apply this technology to the drawing of deeper formations in the workpiece.

In both of these cases, it is apparent that the contact time period during which the two dies are in contact with the workpiece will be somewhat increased as compared to working on thin sheet workpieces such as thin sheet metal and/or drawing relatively shallow formations. In these cases, any degree of mismatch in linear speed between the workpiece itself, and the two dies becomes much more significant.

Accordingly, it is desirable to provide in the first place a method of accommodating the mismatch in speed occurring between the dies moving around a rotary arc, and the workpiece moving along a linear path.

A further problem however relates to the design of the rotary apparatus itself.

In the above noted U.S. patent, and the development thereof described above, herein termed the "two pin rotary", and the "four pin rotary" respectively, the circumferential path around which the die itself could pass was determined by the circumferential path around which the semi-rotary die supports themselves could pass. This meant that if it was desired to increase the size and particularly the depth, of the dies, the entire design of the rotary apparatus had to be redesigned to accommodate these variations.

This clearly either limited the degree of application of the rotary apparatus or meant that considerable engineering costs were incurred each time the rotary apparatus was designed to handle a particular size and depth of die.

Clearly, it is desirable for a more or less standard size of rotary apparatus to be arranged so as to accommodate dies which are themselves of different sizes and in particular in which the dies are of different depths, without being obliged to re-engineer the entire rotary apparatus itself desirably, all that will be required is to place the rotary support devices on centres which are further apart for deeper dies or closer together for shallower dies, and of course, to alter the size and pitch of the gears which interconnect them to ensure that they rotate in unison. This itself is a relatively much simpler task than re-engineering the whole of each pair of the rotary devices themselves.

For the purposes of this application, the term "forming" is deemed to incorporate by reference any die operation which may be performed on a workpiece, whether it may be termed in the trade as "embossing" "forming" "drawing" "blanking" "cutting", or any other operation on a workpiece which is performed by a pair of dies, and wherever used herein the term forming is deemed to incorporate any and all such operations, including those not specifically mentioned above.

DISCLOSURE OF THE INVENTION

According to the invention, there is provided a rotary apparatus for continuous rotary forming of web workpiece, the apparatus comprising a rotatable first roll unit and corresponding rotatable second roll unit; a first die support member carried by the first roll unit, the first die support member having a leading edge and a trailing edge respective to rotation of the first roll unit; a second die support member carried by the second roll member, the second die support member having a leading edge and a trailing edge respective to rotation of the second roll unit; means for transporting a web workpiece in a forming plane between said first and second roll units;

each die support member comprising a first part carried by the respective roll unit and including the leading and trailing edge and a second part having a platen surface for mounting a die, the second part being mounted on the first part for reciprocal motion transverse to the leading and trailing edges.

Each first and second die support member may be rotatably received in a longitudinal recess of its respective roll unit, the recess having a concave arcuate bearing surface a complementary to a convex arcuate surface of the first part of the respective die support member, the recess defining a concave section of a cylinder and the first part of the respective die support member defining a complementary convex section of said cylinder. The respective concave and convex sections of said cylinder may be minor sections.

Preferably, the first part of each first and second die support member and the second part of the first and second die support members are connected for reciprocal movement with respect to each other through resilient connecting members. Each resilient connecting member may be formed of polyurethane rubber and may be seated in seating recesses in both of the first and second parts. Stop members may be provided to limit the reciprocal motion on one of the first and second parts.

Rotation of the first part of the die support member in the recess is controlled by cam means which may include a cam follower on at least one end of the die support member in the region of the leading edge engaging a continuous cam. Suitably the cam means also includes a cam follower on the other end of the die support member in the region of its trailing edge and engaging a continuous cam.

Alternatively the cam means may comprise a four pin system including a cam follower on one end of a die support member in the region of a leading edge and engaging a continuous cam, a cam follower on the other end of said die support member in the region of the leading edge and engaging a discontinuous cam, a cam follower on said one end of the die support member in the region of the trailing edge and engaging a discontinuous cam, and a cam follower on the other end of said die support member and engaging a continuous cam.

According to the invention there is also provided a rotary apparatus for rotary forming of a web workpiece which apparatus comprises: a rotatable first roll unit and corresponding rotatable second roll unit, said units being connected for synchronous rotation through rotary cycles, each of said units comprising a carrier having a central axis for rotation thereabout; means for transporting a web workpiece between said units in a forming plane at a web speed; means for rotating the first and second roll units at constant opposite rotational speed to have a roll unit tangential peripheral speed at the forming plane similar to the web speed; each roll unit being provided with at least one recess defining a concave minor section of a cylinder having a longitudinal axis parallel with said carrier central axis; a die support member having a leading edge and a trailing edge being rotatably received within said recess, the die support member including a first part having a curved convex surface nested in said recess and defining a similar minor section of said cylinder, the die support member also including a second part projecting out of said recess and said die support member being rotatable about the notional central axis of said cylinder and offset from the first part of the die support member. The first part and the second part of each die support member may be separate one from the other and connectable one to the other.

The cam means, as in the previous alternative, may comprise a cam follower on at least one end of the die support member in the region of the leading edge engaging a continuous cam. Again, suitably, the cam means includes a cam follower on the other end of the die support member in the region of its trailing edge and engaging a continuous cam.

As before, the cam means may be a four pin system including a cam follower on one end of a die support member in the region of a leading edge and engaging a continuous cam, a cam follower on the other end of said die support member in the region of the leading edge and engaging a discontinuous cam, a cam follower on said one end of the die support member in the region of the trailing edge and engaging a discontinuous cam, and a cam follower on the other end of said die support member and engaging a continuous cam.

The cam follower in the region of the leading edge and the cam follower in the region of the trailing edge may be located on end extensions of the die support member, the extensions extending out of the recess and respectively flush with ends of the second part of the die support member. The axles of the die support member may also be located on the extensions. Such a system may provide substantial versatility. For example it may be possible to interchange dies of different depths on the die support member.

Each roll unit may suitably include four die support members.

Bearing arms may provided for said axles of each die support member, the bearing arms being rotatable on the carrier central axis.

The invention further comprises a rotary apparatus wherein a cut to length mechanism is provided upstream of the rotary forming apparatus, whereby the workpiece may be cut into separate plates or pieces, which are then passed successively through the rotary apparatus, in timed relation to the formation of openings, or other formations therein by the rotary apparatus.

The invention further comprises such a rotary apparatus, wherein provision may be made for separating one of the rotary units from the other in a pair of rotary units, so that a portion of workpiece may pass therethrough untreated while maintaining the rotation of said moved rotary unit, whereby to maintain the rotation of the two rotary units in timed relation continuously.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

MODES OF CARRYING OUT THE INVENTION

Figure 1:
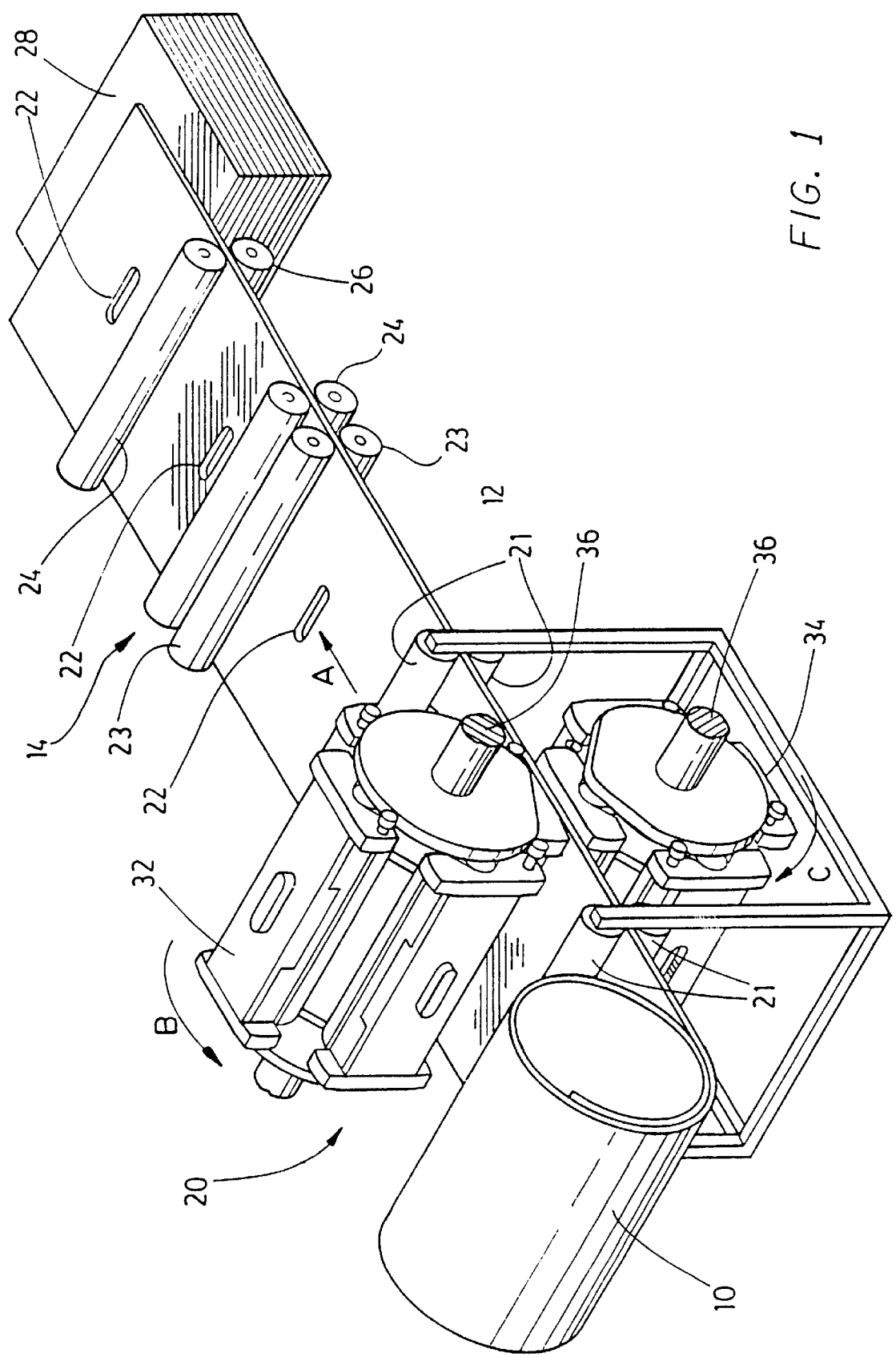
FIG. 1 is a schematic illustration in perspective of a manufacturing line incorporating rotary apparatus according to the invention.

Referring to FIG. 1, there is illustrated a roll 10 of workpiece material web 12 such as metal sheet or plate, e.g. steel plate upon which it is desired to perform various shaping or forming operations. Such operations may typically be performed in a manufacturing line 14. Web material 12 may be unwound from roll 10 and passed continuously along line 14, in the direction indicated by arrow A. Alternatively, when material 12 is plate, any other feed may replace roll 10. The various forming operations are performed on material 12 as it passes different points along line 14. As material 12 is unwound from roll 10, typical first operations may be rolling at stations 21 and die forming operations, performed by a rotary apparatus 20 according to the invention. Apparatus 20 may punch holes 22, or form complex indentations, or both, in material 12 as it passes through apparatus 20. Subsequent operations may typically include roll-forming operations at station 23. Further operations as desired may be carried out at station 24. The final operation is typically the cutting of material 12 in cutting station 26 into standard lengths 28 convenient for further manufacturing or assembly processes and for storage. Stations 23, 24, 26 are illustrated partly in schematic form. Some stations may incorporate typical longitudinal roll forming dies well known in the art (not shown) and the cut off may in fact be a flying shear well known in the art (not shown) or another set of upper and lower rotary units, with suitable dies.

Further nip rollers (not shown) may be used to guide material 12 through stations 23, 24 and 26. Of course, any number of stations 21, 23, 24 and 26 may be used in sequence, as desired.

The above description of a typical manufacturing line is provided herein in order to facilitate the description of the invention. The description of the manufacturing line is not intended to limit the invention in any way. Rather the apparatus according to the invention may be used in any manufacturing line or in any situation requiring high speed, continuous, accurate die forming of strip material.

While references made herein to "sheet metal" it will be appreciated that the invention is not limited in any way to the forming of sheet metal. A wide variety of different "materials" may require to be formed, within the generic meaning of that word as defined herein, using the rotary apparatus in accordance with the invention. Such material may be fed from a roll, or may be fed in pieces through the rotary apparatus, and accordingly where used herein the term "strip material" is deemed to include any such material which may be formed in such rotary apparatus, in accordance with the generic use of the term formed as defined herein.

Figure 2:
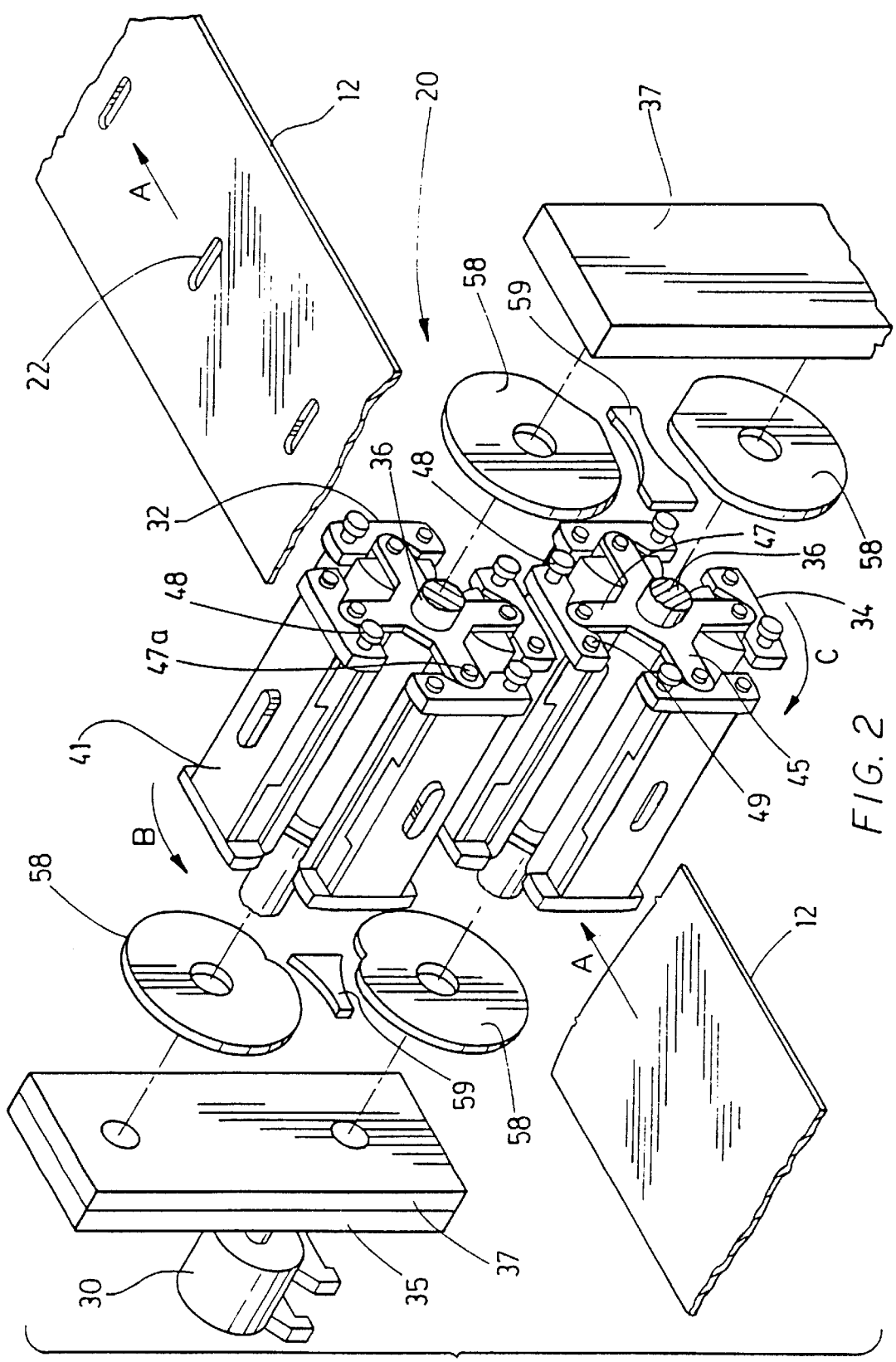
FIG. 2 is an exploded schematic illustration in perspective of a rotary apparatus according to the invention.

Referring to FIG. 2, there is schematically illustrated a rotary apparatus 20 according to the invention. Motor 30 drives upper roll unit 32 in unison with and, at the same speed, as lower roll unit 34 through transmission 35 and shafts 36. The direction is, however, opposite. The workpiece web 12 passes between and is contacted by upper and lower units 32 and 34. Upper and lower units 32 and 34 may be supported by suitable bearing means 37. In this embodiment motor 30 and transmission 35 are such as to provide the outer surfaces of upper and lower units 32 and 34 at the point of contact with material 12 with essentially the same speed as material 12, so that there is no slippage or relative motion between the material 12 and either or both of upper unit 32 and lower unit 34.

Motor 30, transmission 35, and bearings 37 may all be standard components as are well-known in the machine tooling industry.

Figure 3:
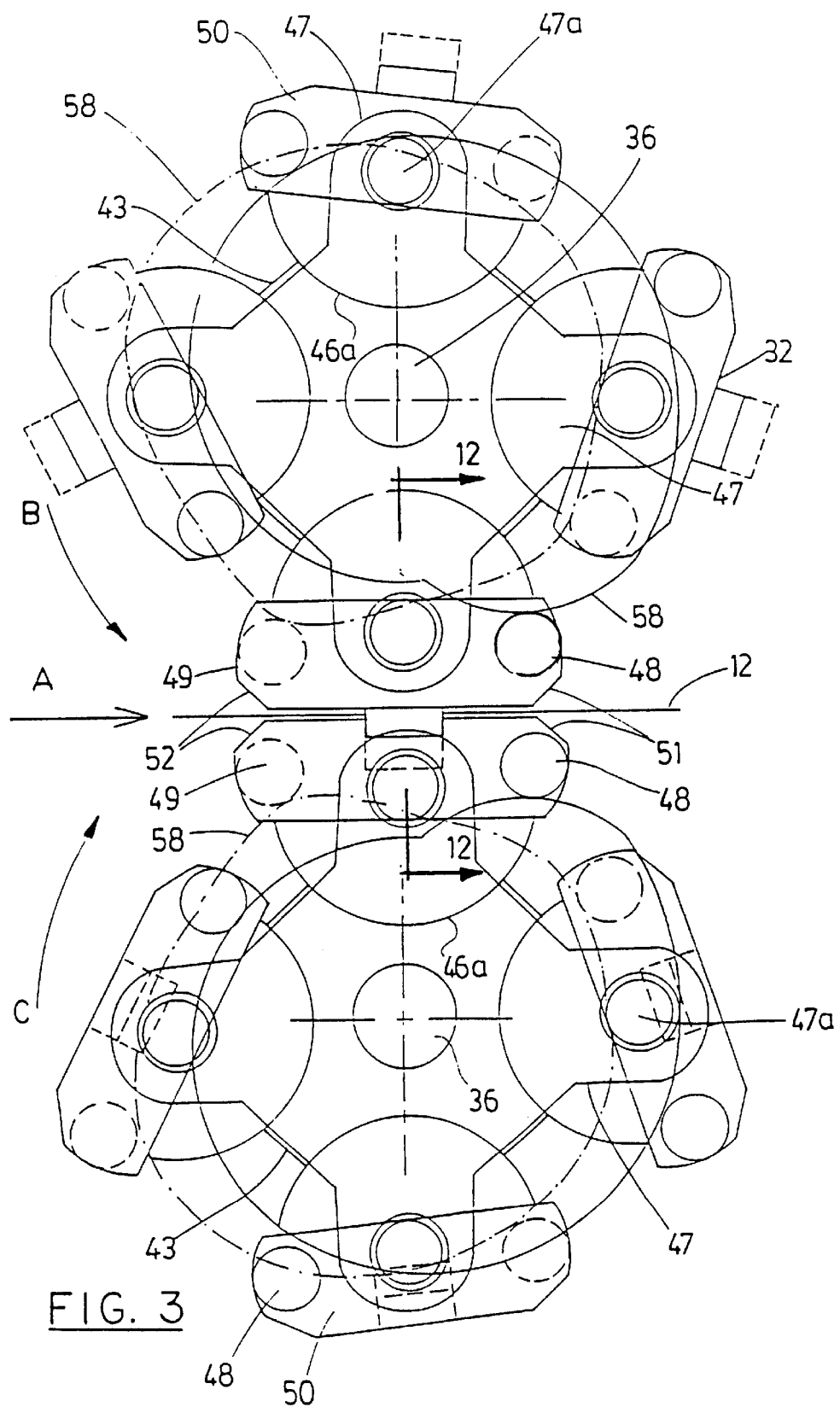
FIG. 3 is a schematic illustration from an end of the rotary apparatus of FIG. 1.

FIG. 3 illustrates in cross-section upper die unit 32 and lower die unit 34 in position to die form sheet material 12. Upper unit 32 rotates counter-clockwise in the direction indicated by arrow B. Lower unit 34 rotates clockwise in the direction indicated by arrow C. Material 12 moves from left to right in the direction indicated by arrow A.

It will be appreciated that the designations "upper", "lower", "left" "right", "clockwise", and "counter-clockwise" are for convenience of description only and are not intended to limit the invention, which will operate equally effectively in any direction or orientation. Similarly, references to an "upper die" located in a certain position and to a corresponding "lower die" in a certain corresponding position are not intended to limit the invention. upper and lower dies 38 and 40 operate as a pair and the individual location of each is irrelevant to the invention so long as the pair operates together at the required location and time.

Figure 4:
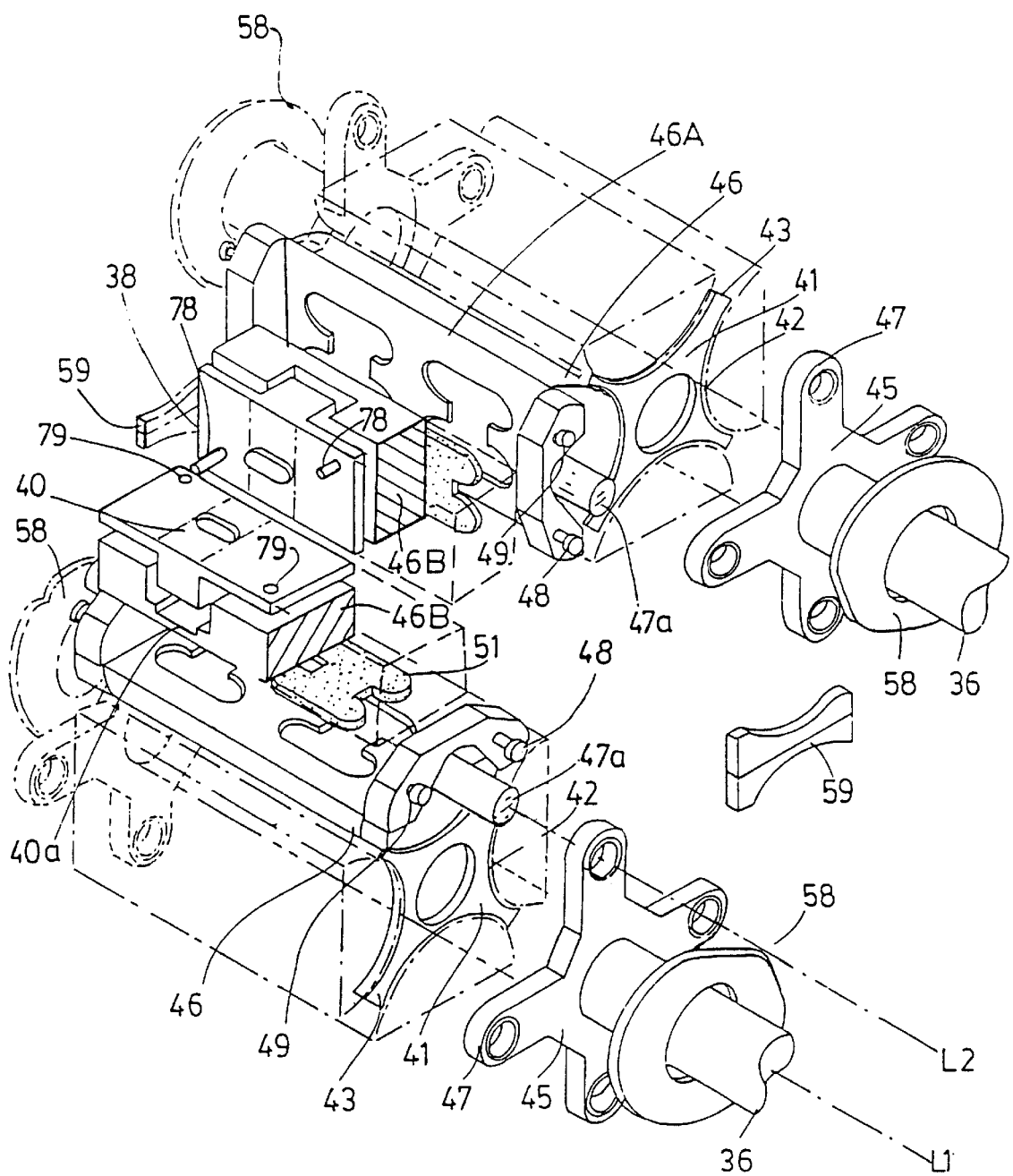
FIG. 4 is an exploded perspective view of the rotary apparatus of FIG. 2.

Upper unit 32 is essentially identical to lower unit 34. Referring to FIGS. 3 and 4, upper unit 32 includes upper carrier member 41, which defines a central axis L1 about which upper unit 32 rotates on shaft 36. Member 41 defines at least one (in the illustrated embodiment, there are four) recesses or openings 42, each in the shape of a minor concave section of a cylinder each having a notional axis L2. The section extends longitudinally parallel to the central axis L1 of member 41. Member 41 further defines abutments 43 between openings 42.

Referring to FIG. 4, the die support members 46 are retained within openings 42 by bearing arms 47 projecting radially from bearing member 45 which is rotatable with the respective upper unit 32 or lower unit 34.

A bearing member 45 is provided to each end of upper and lower units 32, 34. Bearing arms 47 receive stub axles 47a projecting from each end of die support members 46, whereby the die support members 46 are retained within recesses 42 but are able to rock within the recesses by rotation of stub axles 47a in pivot arms 47. In fact the axis of rocking of the die support members is coincident with the notional axis L2 of the cylinder defined by curved surface, but is not coincident with the chordal surface, since the arc of the curved surface is less than 180°.

Figure 5:
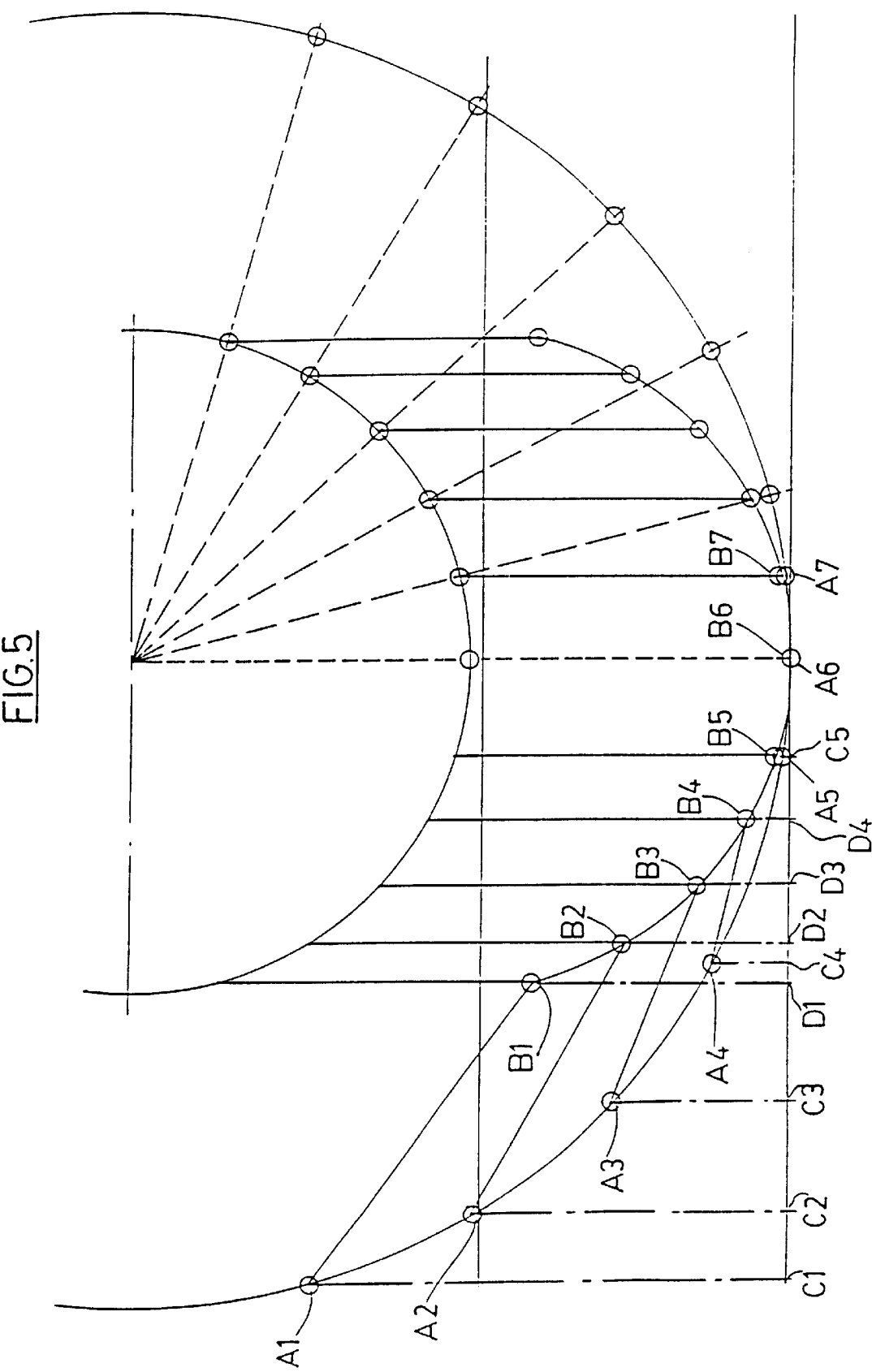
FIG. 5 is a sketch of the comparison of rotary and linear speed of the workpiece and dies respectively.

FIG. 5 is a diagram showing the progression of comparative points A1, A2, A3 . . . etc. at the rotational surface with points A1, B2, B3 . . . etc. of a die. From the projection of points A1, A2, A3 . . . etc. onto the web 12 at respective points C1, C2, C3 . . . etc, that there is considerable variation of the linear speed component of a point strictly on the rotational surface. Points A1, A2, A3 . . . etc. may be translated to points B1, B2, B3 . . . etc. by rocking or swinging of rotary member 46a in recess 42, thus advancing the leading edge of the die support member with respect to the surface of rotation. Projection of points B1, B2, B3 . . . . etc. onto the web 12 to points D1, D2, D3 . . . .etc. respectively show much less variation of the linear component of the compensated rotational speed.

Each die-support has a cross-section that is bounded by an arc and chord of a circle. The section is less than 180° of arc so that the rotary member is less than a semi-cylinder. Die support member 46 also comprises a platen die shoe 46b connected to the rotary member 46a. In FIGS. 1 and 3, a first or leading guide pin or cam follower 48 extends from one end of member 46 and a second or trailing guide pin or cam follower 49 extends from the other end member 46. Guide pins 48 and 49 are mounted on end extensions 50, attached to opposite ends of rotary member 46a.

As shown in FIG. 3, each die support member defines a leading edge 51 and a trailing edge 52.

Figure 6:
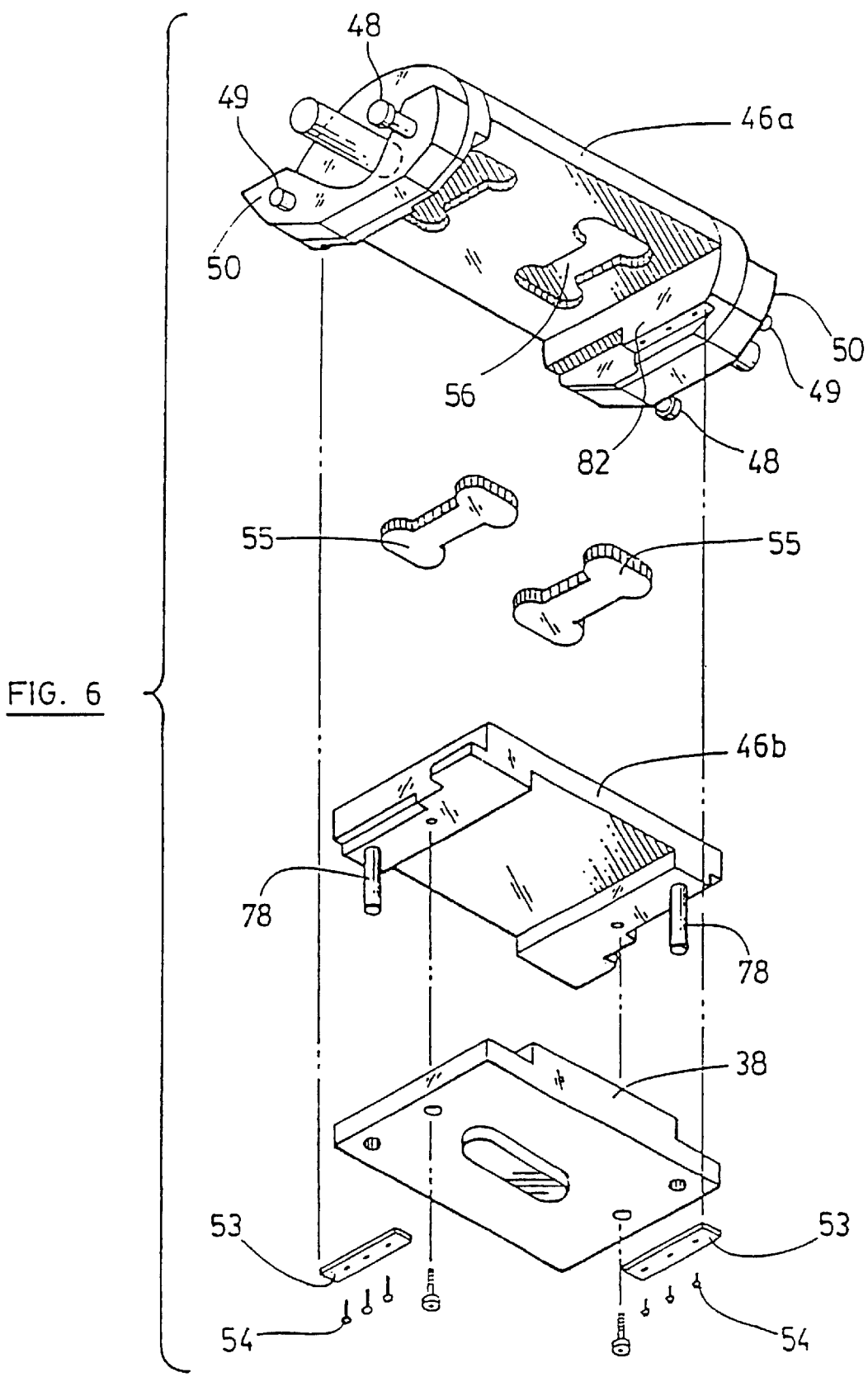
FIG. 6 is an exploded view of a die support member, and platen shoe.

The die platens or shoes 46b are slidably retained within the die support 46a by means of longitudinal edge plates 53 secured to the end walls of the die supports by means of bolts 54 (FIG. 6). Plates 53 may engage either the side edges of the platen shoes 46b, or the side edges of the dies 38, 40 themselves.

Resilient cushioning members 55 are located in recesses 56 in rotary member 46a and in recesses 57 in platen shoes 46b. These resilient cushioning members 55 may be made of polyurethane rubber.

Guide pins 48, 49 ensure that the platen shoes 46b are located in the desired position. Guide pins 48 and 49 are arranged to engage respective full cams 58 and partial cams 59 as described for example in U.S. Pat. No. 5,040,397, previously referred to. Full cams 58 are offset axially outwardly and partial cams 59 are offset inwardly, in the manner explained in the aforesaid U.S. Patent. In this way cams 58 provide guidance and control around 360°, and cams 59 control each die support from just prior to closing to just after closing of the dies. On a member 46, pins 48 and 49 define and lie on different axes adjacent leading and trailing edges 51, 52.

The platen die shoes 46b, are thus slidably mounted on support 46, and are biased centrally by cushioning members 55.

Stub axles 47a define axes which are outside the chord of the rotary member 46a.

In FIGS. 2 and 4, leading and trailing pins 48, 49 are provided at both ends of member 46. Upper and lower dies 38-40 are mounted on platen shoes 46b of members 46 in any conventional manner (eg bolts—not shown). Dies 38–40 are mounted on members 46 essentially parallel to the platen shoe 46b. FIGS. 4 and 6 show dies 38–40 and platen shoes 46b in foreshortened form so that view of other parts of the die support member may be seen. The shoes 46b and dies 38–40 are shown in broken lines, in FIG. 4.

An opening 40a in the lower (female) die may be provided (FIG. 4) to permit a slug (not shown) to be ejected from the die.

Operation of the guide pins 48, 49 in conjunction with cams 58 and 59 will now be described.

In FIG. 4 leading pins 48 and trailing pins 49 are provided at both ends of each member 46, and in FIGS. 1 and 3 leading pins are provided at one end and trailing pins at the other end of each member 46.

In FIGS. 2 and 4, leading and trailing pins are shown at both ends.

Whatever the manner of providing leading and trailing pins, it is necessary to provide a cam for guiding each set of pins for the proper positioning of the dies 38–40.

Where leading pins 48 and trailing pins 49 are provided at both ends of the members 46, the leading pins 48 may project outwardly of the trailing pins for accessibility to their cam 58 in the region where the die is to engage the workpiece 12 while allowing access of the trailing pins 49 to their cam 59 in the region where the die is to engage the workpiece 12. It will of course be necessary to adjust the shape of cams 58, 59 previously referred to, to engage the respective pins.

It will be appreciated that the cam paths 58 and 59 of FIG. 3 may be adapted to the use of pins 48 and 49 at each end of the member 46 by providing cam surfaces only to engage pins 48, 49 when the respective die approaches, passes through and leaves the die forming region where exact registration with the cooperating die is necessary.

Cams 58 and 59 are provided fixed relative to the axis L1. Cams 58 and 59 are shaped and pins 48 and 49 are positioned relative to members 46 whereby the forming planes of dies are essentially parallel to web 12 immediately prior to, during and subsequent to closing. Because each member 46 is each supported by at least two pins on different axes the members may be less prone to rock or otherwise move within their fittings than were those in earlier rotary forming devices. Indeed, when pins 48 and 49 are each provided at both ends of member 46, then the member is supported stably by four pins. Thus in comparison to previously used rotary devices the clearances required by the cam follower mechanism do not have as great an effect on the accuracy of performing operations.

To ensure further accuracy, die registration pins 78 are provided to either side of die 38. Each registration pin 78 registers with a complementary bore 79 of the cooperating die member 40 of the other unit. Pins 78 and bores 79 are shaped, sized and located on either side of web 12 so that they may cooperate and register with each other without interference with web 12. As upper and lower units 32 and 34 rotate, register pins 78 on upper dies 38 extend toward and are partially inserted into complementary bores 79 in lower dies 40 prior to contact with web 12. As dies 38–40 come into contact with web 12, the pins 78 are fully inserted into the bores 79, thus ensuring the dies contact web 12 in proper registration with each other.

In operation upper and lower units 32 and 34 rotate. Each die rotates through the successive illustrated positions of each unit. A closed position of apparatus 20, which is the position at which web 12 is formed, stamped or otherwise treated is that in which two dies cooperate one with each other for this purpose. It may be regarded as defining the starting point of the rotary cycle. Rotation continues, with each unit rotating to opposite hand.

At the starting position web 12 is formed by the upper and lower dies and, as rotation continues upper and lower dies are separated and pins 48 and 49 follow their respective cams 58 and 59. As rotation continues, the pins 48 cause upper and lower members 46 to swing in their recesses 42 to take up a proper position parallel to each other as they re-approach the starting position.

The slidable mounting of the die shoe on the die support member enables the apparatus to compensate for varying actions between the linear web speed and the rotational die speed.

This embodiment comprising a rotary die support member 46a and a platen shoe 46b. The shoe is reciprocal with respect to the support transversely to the central carrier axis L1. Such transverse movement, i.e. movement along the axis of the web, enables compensation of any discrepancy of speed between rotary units 32 and 36, and web 12. The platen shoe, 46b may move reciprocally on resilient cushioning members 55 of which two are shown. The members 55 have enlarged ends to limit sliding. The reciprocal motion advances or recedes the platen shoe 46b with respect to the rotary motion.

Figure 7:
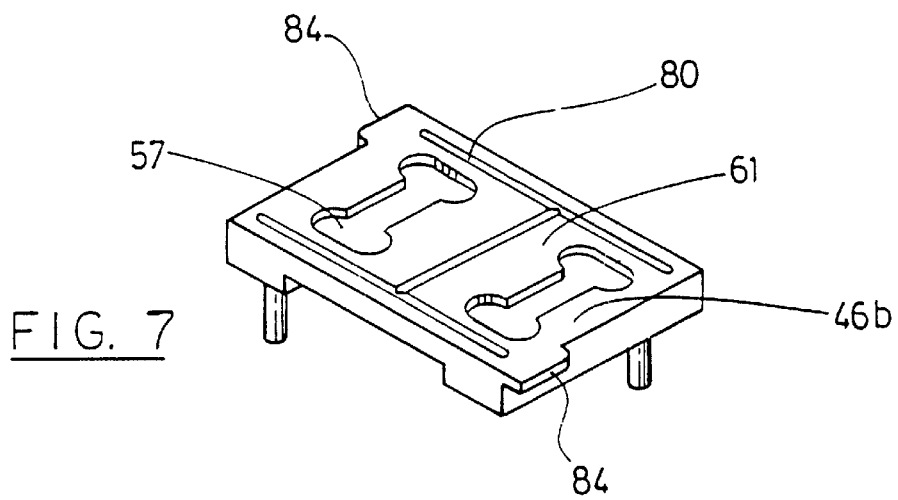
FIG. 7 is a view of the platen shoe portion of the die support member showing its connecting surface with the other part of the die support member (the die itself being omitted)

Referring to FIGS. 6, 7 and 8, a die support member 46a is connected to a platen shoe 46b through resilient members which seat partially in recesses of the rotary member 46a and partially in recesses of platen shoe 46b. Either one of rotary member 46a or platen shoe 46 has a H-shaped grease groove 80. Stop means are also provided. Thus, stop 82 on end extension of rotary member 46a co-operates with abutment 84 on platen shoe 46b.

Figure 8A:
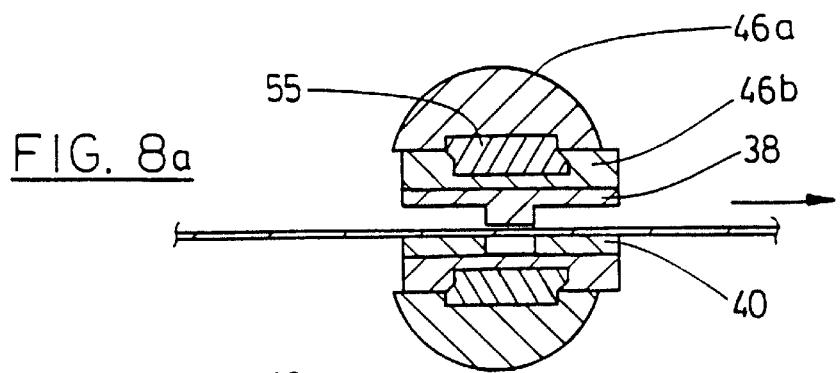
FIGS. 8a, 8b, 8c illustrate reciprocal movement of the die support and the die shoe at different stages in operation.
Figure 8B:
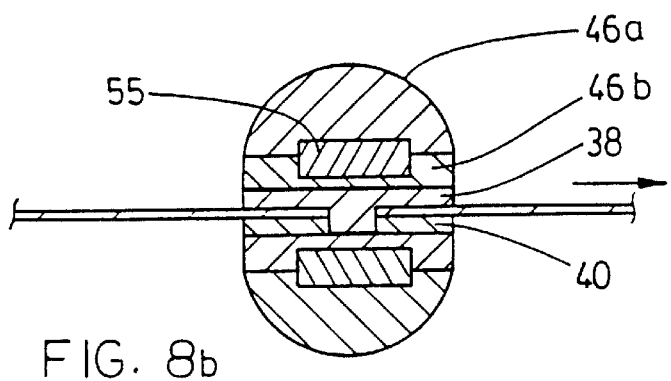

In operation, as dies 38–40 approach the forming plane and contact web 12, platen shoes 46b of both upper and lower units 32, 34 will be advanced into the position shown in FIG. 8a. In this position, resilient members 55 are biased and deformed as shown. As dies 38–40 exactly pass through the forming plane, the position of FIG. 8b is reached. The equalization of the linear component of the rotary speed, and the web speed matches the linear speed of the platen members 46b, the platen members have slid rearwardly to a median position (FIG. 8b).

Figure 8C:
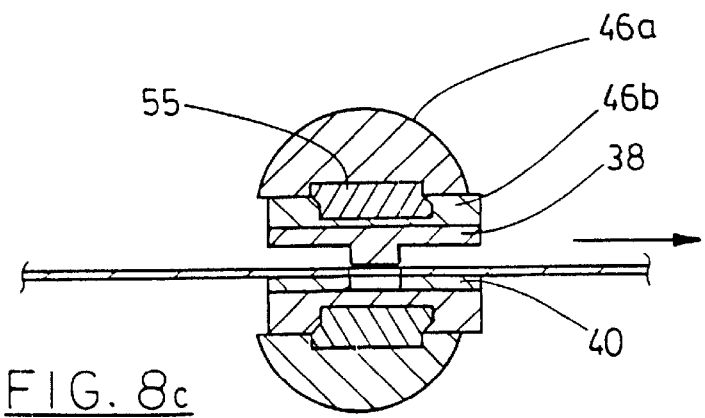

As the dies 38–40 leave the forming zone, the linear component of the linear die speed again decreases relative to the web, and the position of FIG. 8c is reached. The die shoes are again drawn forwardly to match the web speed, until the dies separate from the workpiece. The die shoes then slide back to their centre, median position.

Figure 9:
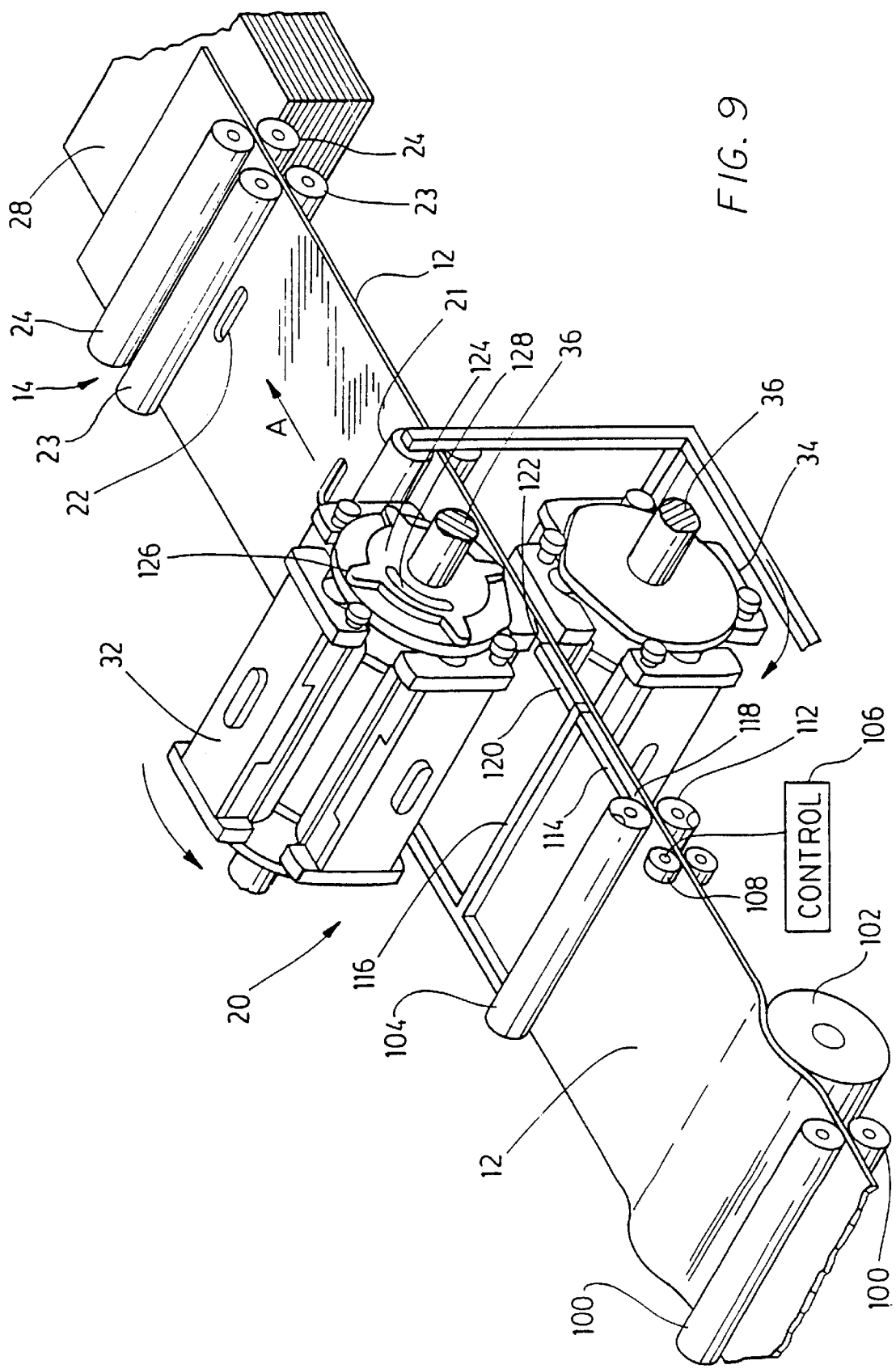
FIG. 9 is a sketch of an alternate embodiment of a rotary apparatus set up for feeding cut plate.

Referring now to FIG. 9, rotary apparatus for forming pre-cut plates is provided.

In this case, the rotary forming station is indicated generally by the upper and lower rotary formers 32 and 34.

These rotary formers are representative merely of the leading pair of rotary formers, and there will typically be two or more sets of rotary formers only one being illustrated here for the sake of simplicity.

In this embodiment of the invention, the cut-to-length operation is carried out upstream of the rotary formers, so as to cut the strip into separate plates or webs of material each of which is separate from the other.

In order to do this, the continuous strip is first of all fed by means represented as strip feed rolls 100. Typically, these will be feeding a web or strip 12 of material from an uncoiler (not shown) of a type well known in the art, description of which is superfluous.

From the strip feed rolls 100 the strip passes over a set of hump roll 102. The purpose of the hump roll, is to form the strip into a shallow upward curve, the purpose of which will be apparent below.

From the hump roll, the strip is then fed between a pair of cut off rolls 104. Typically, these cut off rolls will be made in the same way as the rotary apparatus described above; that is to say they will have upper and lower roll units, each of which is provided with at least one rotary die support as previously discussed, and the die supports will be controlled by cams in the manner described above. In this case, it may or may not be necessary to provide the sliding relationship between the die shoe and die support described above, again for reasons described.

The cut off rolls 104 are normally stationary, and spaced apart a sufficient distance for the strip to pass therethrough. They are operated by any suitable control mechanism indeed generally as control 106 which in turn is connected to a typical digital length measuring device 108 indicated simply as a roll operating on one side or both of the strip.

A plate pair of plate stop arms 114 are swingably mounted on a cross shaft 116, and at their upstream ends 118 are adapted to intercept the leading edge of the plate just before it enters the cut off rolls 104.

The stop arms 114 are connected to an operating arm 120 extending from shaft 116 downstream, adjacent the upper rotary forming unit 32.

At its downstream free end it is provided with a cam roller 122.

The arm 114 is normally held in its upper position by means of the spring and adjustable bolt (not shown).

A feed cam plate 124 is mounted on the end of the upper rotary roll unit 32. cam plate 124 has a plurality, in this case four operating cams 126 spaced apart therearound. The cam plate 124 is secured to the roll unit 32 by means of arcuate slots 128 and adjustable fastening bolts.

In this way, the location and orientation of the cam plate relative to the upper roll unit can be adjusted, for precise operation or in cases where the length of the plates cut off the end of the strip are varied from one run to another.

In the operation of this embodiment of the invention, strip material is first of all fed by the strip feed rolls to the hump table, where it is formed into a shallow upwardly convex hump.

In one mode of operation, the length of the strip material 12 is desired to be cut off to form a plate, or separate web or piece, can be measured by the strip measurement unit 108. A signal from the strip measurement unit 108 can then signal the control 106 to operate the cut off roll, and to cut off the leading end of the strip at a precise length thereby forming it into a plate or web piece, separate from the strip 12.

The spacing between the cut off rolls 104, is such that it is generally speaking appropriate to the length of the strip that it is desired to cut off and form into a plate.

The leading edge of the strip will already have been intersected by the upstream stop members 118 on the stop arms 114, so that the strip is momentarily prevented from entering the cut off rolls 104.

Since at this point the strip is temporarily halted, the shallow upward curve of the strip on the hump table will gradually rise.

A cam 126 will then depress cam 120 and raise stops 118. The strip can then pass between the cut off rolls, which are open, and stationary, at this point.

The strip advances to the rotary former 32–34, in precisely timed relation to the rotation of the former 32–34. Formations will then be made at precise locations with reference to the leading edge of the strip.

The measurement unit 108 will then signal control 106. The control 106 will then operate the cut off rolls, to cut off the plate to the right length or web to the right length. In this way, the strip or web is cut to a predetermined precise length at predetermined intervals prior to entering the rotary former.

This will ensure that the rotary formers will form, and/or emboss and/or blank out the necessary formation in the piece of plate or piece of web, at precise intervals starting from the leading edge of the plate or web piece which is fed from the plate feed rolls.

As an alternative to the mechanical cam operation of arms 114, it be operated by eg a cylinder 129 (shown in phantom), connected to control 106. Control 106 will then both sense the rotational position of rolls 32–34, operate the cylinder 129 when the rolls are in the correct location for entry of the leading edge of the web.

Figure 10:
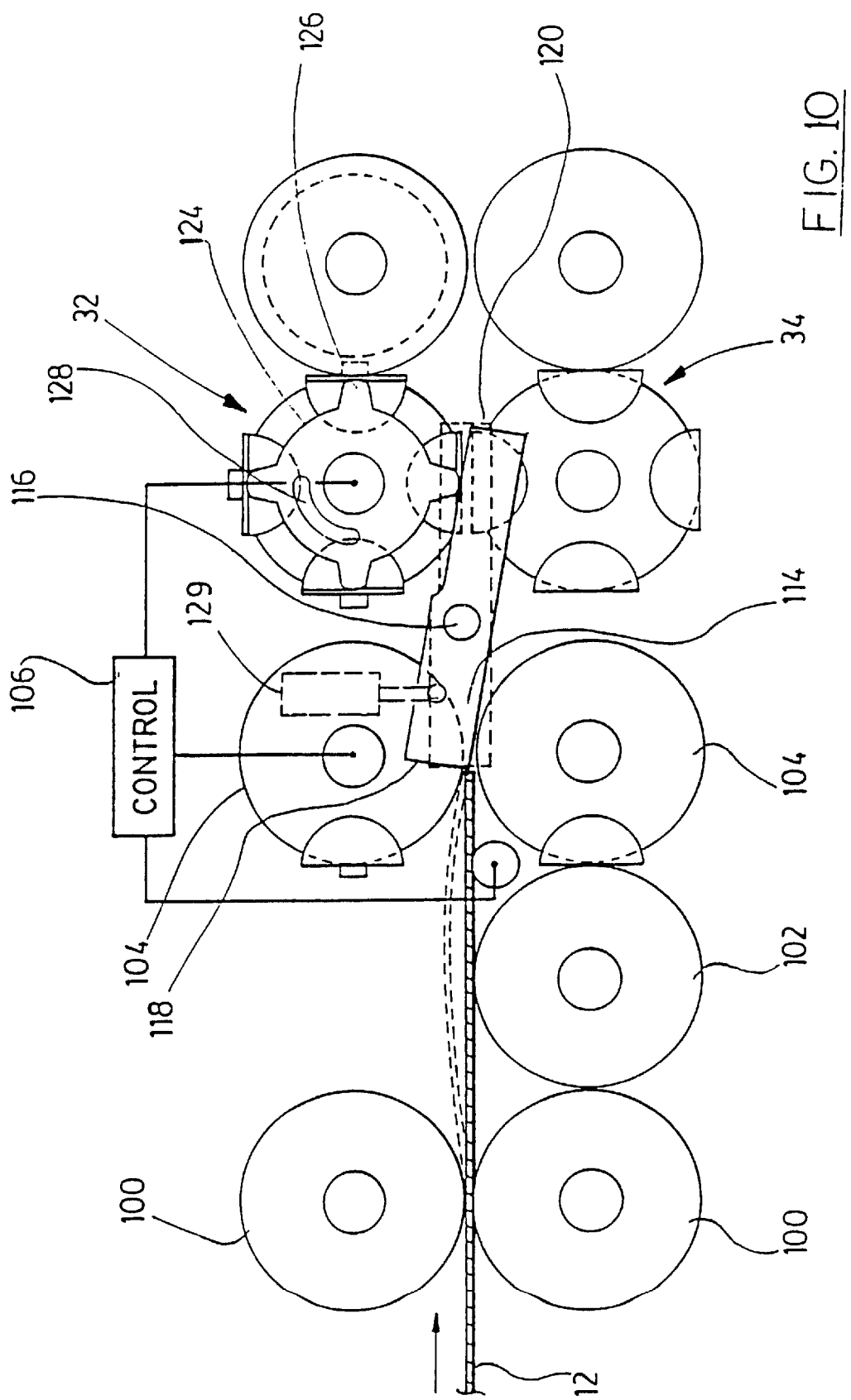
FIG. 10 is a schematic side view of a roll forming line incorporating the upstream cut to length apparatus illustrated generally in FIG. 9; and, FIG. 11 is a schematic side elevation of a rotary apparatus showing the upstream cut to length apparatus, and also showing the movement of one rotary unit relative to the other.
Figure 11:
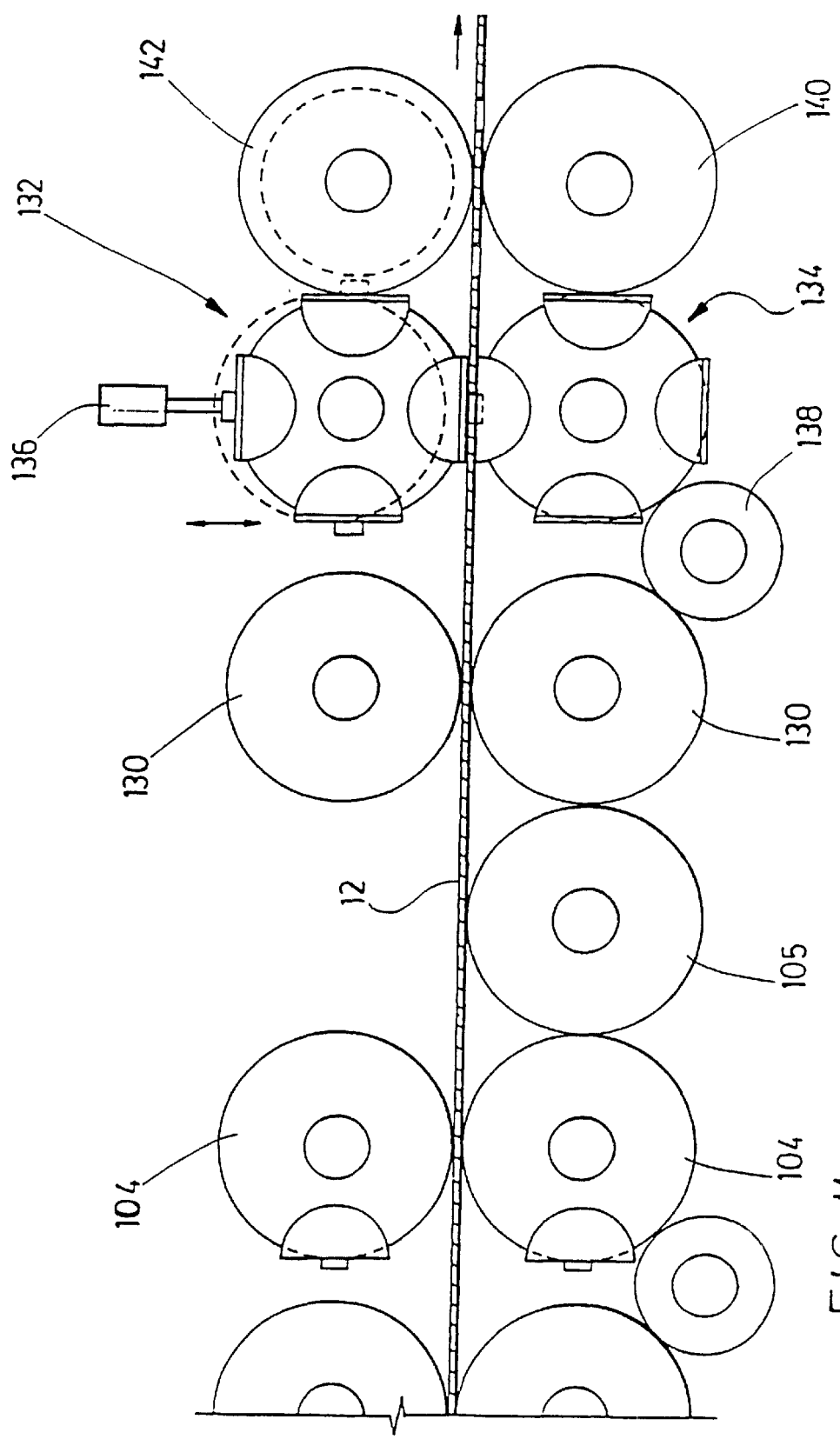

Referring now to a further embodiment of the invention illustrated in FIG. 11, provision may be made, in association with or without the upstream cut to length apparatus described in FIGS. 9 and 10, for the movement of one roll former unit 32–34 relative to the other. The purpose of such relative movement is to momentarily permit a portion of the workpiece to pass between the rotary formers, without any rotary formations being formed therein. This may be desirable at the beginning or end of a predetermined length of a workpiece for example for various reasons.

As illustrated therefor in FIG. 11, the upstream cut off rolls are indicated generally 104 and the idler roll is indicated generally as 105.

A pair of intermediate feed rolls are indicated as 130–130.

A first pair of rotary unit is indicated as 132 and 134 respective. It will be appreciated that a second pair or more pairs of such rotary rolls may be located downstream of the first pair, and would normally be required to operate in the same way as described below, so that the workpiece could pass through each pair of rotary unit, while they are initially open, so that the dies on the respective rotary units will then register precisely with formations already formed at the first pair of rotary units 132–134.

In the first pair of rotary units 132-134, the upper rotary unit 132 is movable for example by means of an hydraulic cylinder 136, between a lower operative position, and upper inoperative position shown in phantom.

It is essential that the upper movable roll 132 shall continue to operate in timed relation to the lower roll 134 during such movement, so that when they close once more i.e. when the upper rotary unit 132 is lowered by the cylinder 136, that the two units are still rotating in unison in a coordinated fashion, with the various dies thereon registering with one another in the manner described above.

In this embodiment, this is achieved by means of an idler roll 138, connecting rolls 130 and 134, and further downstream feed rolls 140 and 142. All of these rolls are connected by gear mechanisms of a type well known in the roll forming art, which require no description, so that all of the rolls are rotating in unison in the appropriate directions.

The upper downstream feed roll 142 is connected by suitable gearing (not shown) of a type well known in the art to upper movable rotary unit 132, and since the movement of the upper rotary unit 132 is minimal, possibly no more than an inch or so in extent, the gearing will not become disengaged, as between upper roll 142 and roll 132, and consequently roll 132 will continue to operate even when it is in its raised position, and when lowered once more will continue to operate in precisely timed relationship with the lower rotary forming roll 134.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A rotary apparatus for rotary forming of a web workpiece as it moves in a web feed direction, said rotary apparatus comprising:
    a rotatable first roll unit and corresponding co-operable rotatable second roll unit mountable on opposite sides of the web and having axes of rotation parallel to each other and perpendicular to said web feed direction;
    a first die support member pivotally carried by said first roll unit in a controlled angular orientation relative to the web;
    a second die support member pivotally carried by said second roll unit in a controlled angular orientation relative to the web, and wherein each said die support member includes a first part carried by its respective roll unit and a second part having a platen surface for mounting a die thereto, the second part being mounted on the first part, the second part being linearly reciprocally movable relative to the first part in the direction of movement of the web workpiece during forming thereof.

2. A rotary apparatus as claimed in claim 1, in which each first and second die support member is rotatably received in a longitudinal recess of its respective roll unit, the recess having a concave arcuate bearing surface a complementary to a convex arcuate surface of the first part of the respective die support member, the recess defining a concave section of a cylinder and the first part of the respective die support member defining a complementary convex section of said cylinder.

3. A rotary apparatus as claimed in claim 1, in which the first and second parts of each die support member are connected for reciprocal movement through resilient connecting members.

4. A rotary apparatus as claimed in claim 1, in which rotation of the first part of the die support member is controlled by cam means.

5. A rotary apparatus as claimed in claim 4, wherein said die support member has a leading edge, a trailing edge and a pair of transverse ends, and said cam means includes a cam follower on at least one said end of the die support member in the region of the leading edge for engaging a continuous cam.

6. A rotary apparatus as claimed in claim 5, including a cam follower on the other end of the die support member in the region of its trailing edge and for engaging another continuous cam.

7. A rotary apparatus as claimed in claim 4, wherein each said die support member has a leading edge, a trailing edge and a pair of transverse ends, and said apparatus includes:
    a cam follower on one end of said die support member in the region of a leading edge and engaging a continuous cam,
    a cam follower on the other end of said die support member in the region of the leading edge and engaging a discontinuous cam, a cam follower on said one end of the die support member in the region of the trailing edge and engaging a discontinuous cam, and a cam follower on the other end of said die support member and engaging a continuous cam.

8. A rotating assembly for use as one of a pair of co-operating rotating assemblies for forming a web workpiece while that web workpiece is moving in a web feed direction, said rotating assembly comprising:

a rotor having a rotor axis parallel to the web and perpendicular to the web feed direction;

a die mount, and a die mounted thereto, said die mount being pivotally connected to said rotor and being controlledly pivotable about a die mount axis parallel to said rotor axis;

said rotating assembly being operable to present the die to the workpiece at a controlled angular orientation;

said rotor being driveable to engage the die with the web, and said mount permitting translation of the die relative to said die mount axis in said feed direction during engagement of the die with the web.

9. The rotating assembly of claim 8 wherein said die mount comprises a first part pivotally mounted to said rotor, and a second part slidably mounted to said first part, said second part having a seat for rigidly mounting the die thereto.

10. The rotating assembly of claim 8 wherein said assembly further comprises a die angle governor co-operable with said rotor to control the angular orientation of the die during rotation of said rotor.

11. The rotating assembly of claim 10 wherein said governor is a cam system, and said die support member has at least one cam follower engageable with said cam system.

12. The rotating assembly of claim 8 wherein said angular orientation is controllable before and after engagement of the web.

13. The rotating assembly of claim 8 wherein said angular orientation is constant relative to the web during engagement of the die with the web.

14. The rotating assembly of claim 13 wherein mount includes a first part pivotally mounted to said rotor and a second part slidably mounted to said first part, said second part having a platen for supporting the die, and said angular orientation is controllable for maintaining said platen parallel to said plane during engagement of the die with the web.

15. The rotating assembly of claim 8 wherein said second part is biased to one position relative to said first part.

16. The rotating assembly of claim 15 further comprising a resilient biasing member connected between said first and second parts.

17. The rotating assembly of claim 16 wherein said first and second parts have co-operating recesses, and said resilient member is captured between said parts in said recesses.

* * * * *